United States Patent
Kawamae et al.

(10) Patent No.: US 11,915,339 B2
(45) Date of Patent: Feb. 27, 2024

(54) REMOTE OPERATION INSTRUCTING SYSTEM, AND MOUNT TYPE DEVICE

(71) Applicant: MAXELL, LTD., Kyoto (JP)

(72) Inventors: Osamu Kawamae, Kyoto (JP); Masuo Oku, Kyoto (JP)

(73) Assignee: MAXELL, LTD., Kyoto (JP)

( * ) Notice: Subject to any disclaimer, the term of this patent is extended or adjusted under 35 U.S.C. 154(b) by 66 days.

(21) Appl. No.: 17/436,400

(22) PCT Filed: Mar. 4, 2019

(86) PCT No.: PCT/JP2019/008456
§ 371 (c)(1),
(2) Date: Sep. 3, 2021

(87) PCT Pub. No.: WO2020/178960
PCT Pub. Date: Sep. 10, 2020

(65) Prior Publication Data
US 2022/0148230 A1    May 12, 2022

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/011* (2013.01); *G06F 3/0484* (2013.01); *H04N 5/265* (2013.01); *H04N 5/2628* (2013.01)

(58) Field of Classification Search
CPC ........ G06T 11/00; G06F 3/011; G06F 3/0484; H04N 5/2628; H04N 5/265
See application file for complete search history.

(56) References Cited

U.S. PATENT DOCUMENTS 6,342,915 B1 *  1/2002  Ozaki ..................... H04N 7/18
                                                                340/505
2015/0130839 A1   5/2015  Kasahara et al.
(Continued)

FOREIGN PATENT DOCUMENTS

JP    10-257475 A    9/1998
JP    2006-200080 A    8/2006
(Continued)

OTHER PUBLICATIONS

Miyauchi et al, "Stabilizing Image Shake, Increasing Remote Operability of Moving Bodies", Image Lab., vol. 17, No. 12, Dec. 1, 2006, pp. 1-6, ISSN: 0915-6755 (cited in the International Search Report).

(Continued)

*Primary Examiner* — Yu Chen
(74) *Attorney, Agent, or Firm* — Mattingly & Malur, PC

(57) ABSTRACT

A mount type device includes a camera configured to photograph a work site in a wider range than a visual field of a worker; a sensor configured to obtain a visual line of the worker; and a visual line movement detector configured to detect, as visual line movement information, movement of a direction of the visual line of the worker by using the sensor information. The mount type device transmits data on the photographed image and the visual line movement information to an operation instructing apparatus via a network. An operation instructing apparatus includes a display setter configured to extract a first image having a wider range than a visual field range of the worker from the image photographed by the camera, correct the first image using the visual line movement information, and cause a display of the corrected first image; and an instruction image is generated for the worker.

6 Claims, 13 Drawing Sheets

(51) Int. Cl.
*G06F 3/0484* (2022.01)
*H04N 5/262* (2006.01)
*H04N 5/265* (2006.01)

(56) References Cited

U.S. PATENT DOCUMENTS

| | | | |
|---|---|---|---|
| 2016/0269631 A1* | 9/2016 | Jiang | ............... G06T 3/4038 |
| 2016/0284129 A1 | 9/2016 | Nishizawa et al. | |
| 2017/0076491 A1* | 3/2017 | Jiang | ............... G06T 19/003 |
| 2017/0090722 A1* | 3/2017 | Matsuzoe | ......... G06F 3/04817 |
| 2018/0143433 A1 | 5/2018 | Fujimaki et al. | |
| 2018/0349083 A1 | 12/2018 | Kasahara et al. | |
| 2018/0364705 A1 | 12/2018 | Yunoki et al. | |

FOREIGN PATENT DOCUMENTS

| | | |
|---|---|---|
| JP | 2013-016020 A | 1/2013 |
| JP | 2015-095802 A | 5/2015 |
| JP | 2017-049468 A | 3/2017 |
| JP | 2017-068689 A | 4/2017 |
| JP | 2018-082363 A | 5/2018 |
| JP | 2019-003403 A | 1/2019 |
| JP | 2019-016118 A | 1/2019 |
| WO | 2017/056631 A1 | 4/2017 |

OTHER PUBLICATIONS

Hirohiko Sagawa, et al., "Development of a Remote Work Support System Using Augmented Reality", IEICE Transactions on Information and Systems, 2015, vol. J98-D, No. 1 pp. 258-268.

Ryo Miyauchi, et al. "Development of Omni-directional Image Stabilization System using Camera Posture Information", Proceedings of the 2007 IEEE, International Conference on Robotics and Biomimetics, Dec. 15-18, 2007, Sanya, China.

International Search Report of PCT/JP2019/008456 dated Mar. 26, 2019.

* cited by examiner

REMOTE OPERATION INSTRUCTING SYSTEM, AND MOUNT TYPE DEVICE

TECHNICAL FIELD

The present invention relates to a remote operation instructing system, and a mount type device.

BACKGROUND ART

A head mounted display apparatus is being introduced at work sites such as a manufacturing site and a construction site. Various kinds of information such as an instruction from an instructor (or an operator) are displayed on the head mounted display apparatus. A worker in a work site wears a head mounted display, and carries out work while viewing information from an operator.

Patent Document 1 discloses a conventional technique such as a work supporting system including a head mounted display apparatus and the like. In Patent Document 1, a worker wears a head mounted display and a camera configured to photograph the worker and his or her visual line direction. An operator generates an instruction image corresponding to an instruction from an instructor by an information processing apparatus, and causes the head mounted display for the worker to display it. The head mounted display is a semi-transmissive type, and superimposes the instruction image from the operator in a visual field of the worker.

RELATED ART DOCUMENTS

Patent Documents

Patent document 1: Japanese Patent Application Publication No. 2013-16020

SUMMARY OF THE INVENTION

Problems to be Solved by the Invention

However, in a method of Patent Document 1, the instructor can confirm a work site only within a visual field range of the worker. For this reason, even in a case where an event to be given priority occurs in the vicinity of the visual field range, the instructor cannot grasp this, whereby there is a possibility that an instruction to the worker may be delayed. Further, an image photographed by the camera and displayed for the instructor fluctuates in response to movement of a visual line of the worker. Therefore, the instructor may feel unpleasant sickness.

The present invention has been made in view of the above points, and it is an object of the present invention to provide a remote operation instructing system and a mount type device in which an instructor does not feel unpleasant sickness.

Means for Solving the Problem

An outline of representative invention of the present invention disclosed in the present application will briefly be explained as follows. A remote operation instructing system according to the representative embodiment of the present invention includes: amount type device to be worn by a worker; an operation instructing apparatus through which an instructor confirms a work site to output an instruction; and a network through which data are transmitted and received between the mount type device and the operation instructing apparatus.

The mount type device includes: a camera configured to photograph the work site in a wider range than a visual field of the worker; a sensor configured to obtain a visual line of the worker as sensor information; and a visual line movement detector configured to detect, as visual line movement information, movement of a direction of the visual line of the worker by using the sensor information. The mount type device is configured to transmit data on the image photographed by the camera and the visual line movement information to the operation instructing apparatus via the network.

The operation instructing apparatus includes: a display setter configured to extract a first image having a wider range than a visual field range of the worker from the image photographed by the camera, correct the first image using the visual line movement information, and cause a display to display the corrected first image; and an instruction image generator configured to generate an instruction image for the worker. The operation instructing apparatus is configured to transmit the instruction image to the mount type device via the network.

Effects of the Invention

According to the present invention, there is provided a remote operation instructing system and a mount type device, by which an instructor does not feel unpleasant sickness.

BRIEF DESCRIPTIONS OF THE DRAWINGS

DETAILED DESCRIPTION OF EMBODIMENTS

Hereinafter, embodiments of the present invention will be described with reference to the drawings.

First Embodiment

A first embodiment will be described with reference to FIG. 1 to FIG. 11. Note that embodiments, which will be described below, are one example for realizing the present invention, and should be modified or changed appropriately depending upon a configuration of an apparatus to which the present invention is applied and various conditions. The present invention is not limited to the embodiments described below. Further, a part of each of the embodiments, which will be described later, may be combined and configured appropriately.

Figure 1:
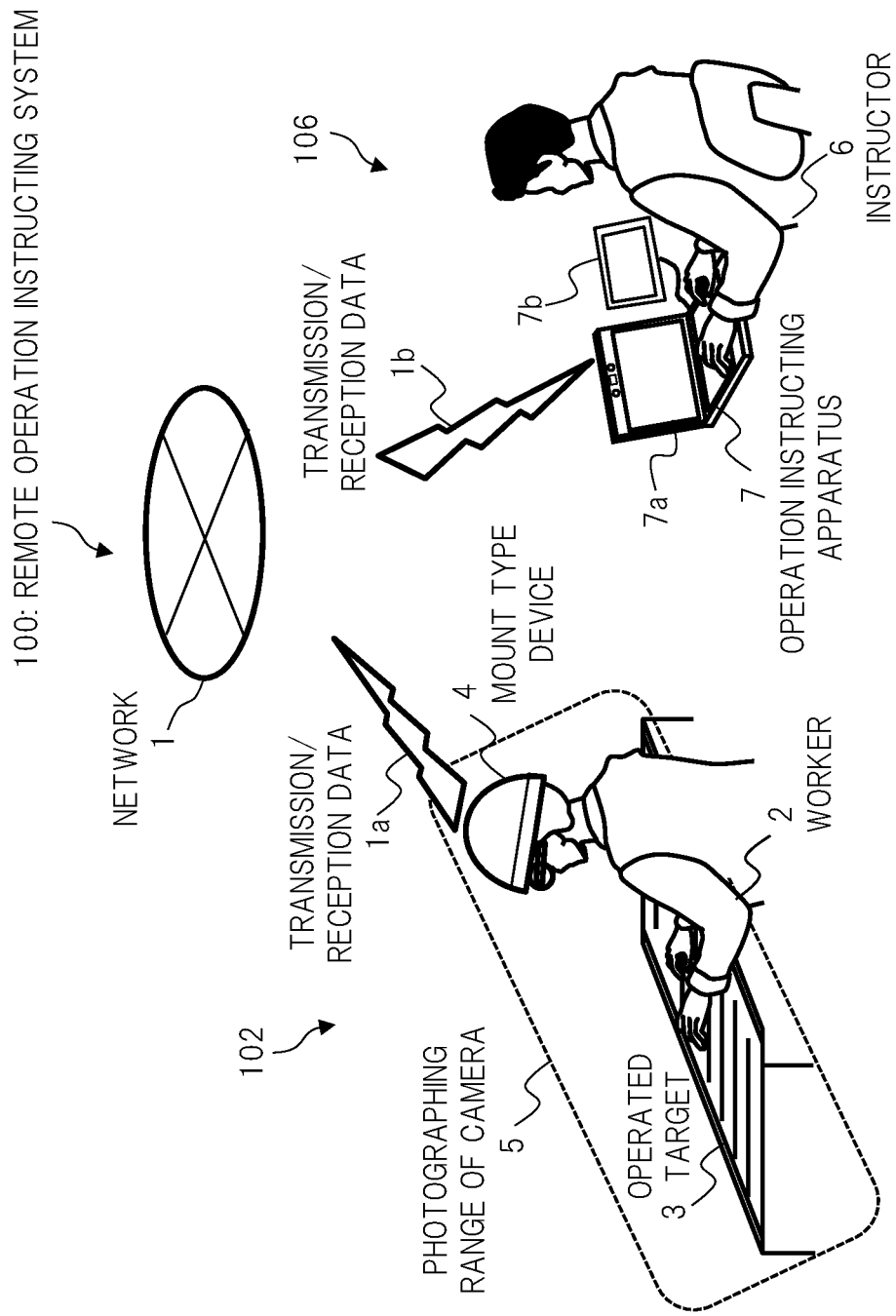
FIG. 1 is a view for explaining an outline of a remote operation instructing system according to a first embodiment of the present invention.

FIG. 1 is a view for explaining an outline of a remote operation instructing system according to the first embodiment of the present invention. In a remote operation instructing system. 100 illustrated in FIG. 1, a worker site 102 at which a worker 2 carries out work and an instructor site 106 at which an instructor 6 carries out a work instruction to the worker 2 are connected to each other via a network 1. In the worker site 102, a reference numeral 1*a* denotes transmission/reception data that are transmitted and received between the worker site 102 and the network 1, a reference numeral 3 denotes an operated target, a reference numeral 4 denotes a mount type device, and a reference numeral 5 denotes a photographing range to be photographed by a camera mounted on the mount type device 4. On the other hand, in the instructor site 106, a reference numeral 1*b* denotes transmission/reception data that are transmitted and received between the instructor site 106 and the network 1, a reference numeral 7 denotes an operation instructing apparatus, a reference numeral 7*a* denotes a main display of the operation instructing apparatus 7, and a reference numeral 7*b* denotes a sub display of the operation instructing apparatus 7.

The mount type device 4 includes a display and the camera. The mount type device 4 extracts an image in a range corresponding to a visual field of the worker 2 from a photographed image photographed by the camera, and projects the extracted image on the display. Alternatively, the worker 2 views the operated target 3 through the display.

The worker 2 wears the mount type device 4, and the camera photographs an area including the operated target 3. Namely, the worker 2 is a wearer of the mount type device 4. The photographing range 5 of the camera covers a range sufficiently wider than a visual field displayed on the display of the mount type device 4. The photographed image of the camera is converted into data, and the data are transmitted to the network 1 as the transmission/reception data 1*a*. Then, the transmission/reception data 1*a* are transmitted as the transmission/reception data 1*b* from the network 1 to the operation instructing apparatus 7 in the instructor site 106.

The operation instructing apparatus 7 is an apparatus that gives a work instruction to the worker 2 by an operation of the instructor 6. The operation instructing apparatus 7 is configured by a personal computer or the like, which can be connected to the network 1, for example. The operation instructing apparatus 7 extracts an image having a visual field range of the worker 2 from the photographed image of the camera, which is obtained from the transmission/reception data 1*b*, and causes the sub display 7*b* to display the extracted image. Further, the operation instructing apparatus 7 extracts an image having a wider range than the visual field range of the worker 2 from the photographed image of the camera, and causes the main display 7*a* to display the extracted image. Therefore, the operation instructing apparatus 7 provides a plurality of images having different ranges to the instructor 6. As a result, the instructor 6 can grasp what the worker 2 is viewing, and visually recognize a state of the work site in the vicinity thereof.

When the instructor 6 inputs a work instruction for the worker into the operation instructing apparatus 7, the operation instructing apparatus 7 generates an operation instruction image (hereinafter, referred to also as an "instruction image"), and superimposes the instruction image onto the image on the sub display 7*b* to display the instruction image. This makes it possible for the instructor 6 to confirm the display content of the display of the mount type device 4 after the instruction image is received. The instruction image is transmitted as the transmission/reception data 1*b*, and then transmitted from the network 1 to the mount type device 4 as the transmission/reception data 1*a*. The mount type device 4 uses the transmission/reception data 1*a* to cause the display to display the received instruction image. The worker 2 can confirm the instruction image by superimposing it on the operated target 3. This improves accuracy of the work.

Figure 2:
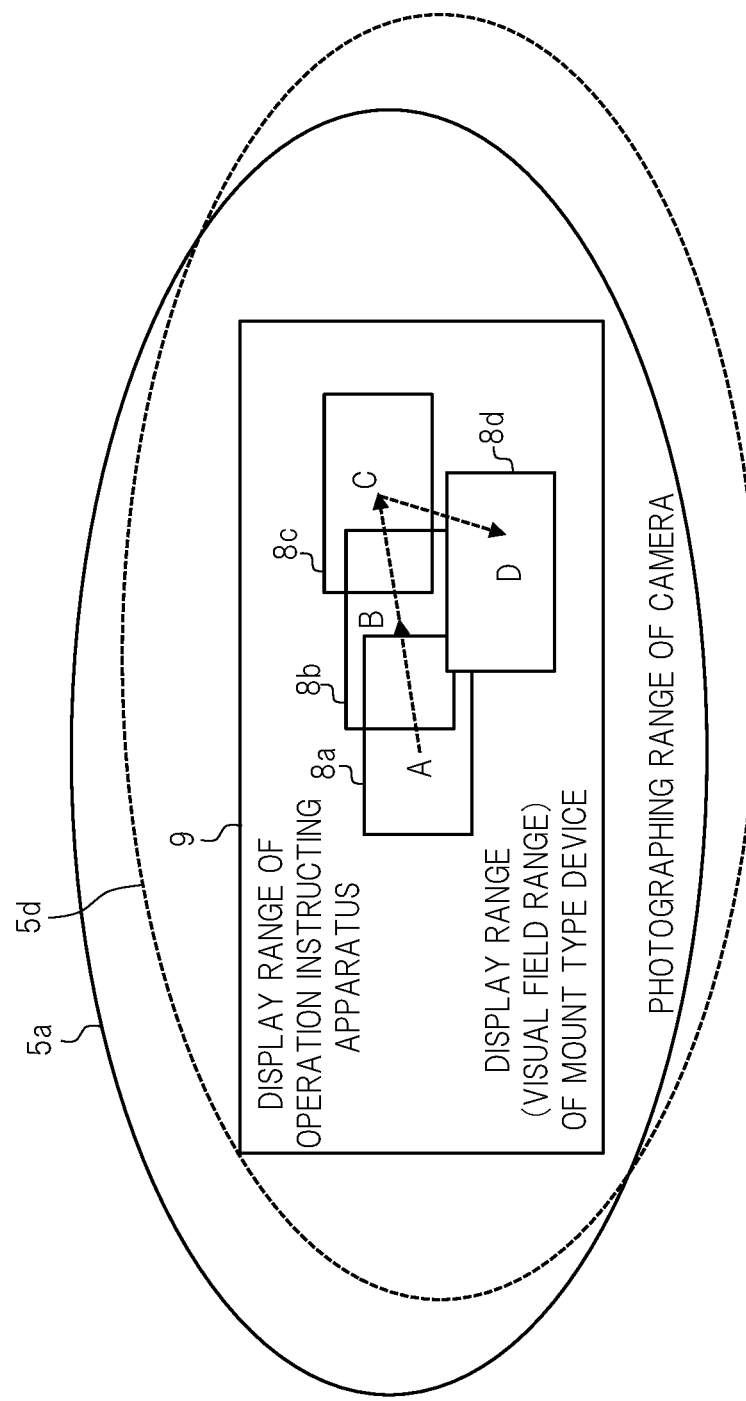
FIG. 2 is a view for explaining one example of an operation of the remote operation instructing system according to the first embodiment of the present invention.

FIG. 2 is a view for explaining one example of an operation of the remote operation instructing system according to the first embodiment of the present invention. FIG. 2 illustrates a relationship among photographing ranges 5*a*, 5*d* of the camera 405 in the mount type device 4, a display range 9 of the image displayed on the main display 7*a* in the operation instructing apparatus 7, and display ranges 8*a* to 8*d* of the display in the mount type device 4. In this regard, ad described above, each of the display ranges of the display in the mount type device 4 is equal to a display range of the sub display 7*b*.

When the center of a visual line of the worker 2 is at a point A, the photographing range of the camera 405 is an area surrounded by 5*a*, and the display range of the mount type device 4 is an area surrounded by 8*a*. The instructor 6 operates the operation instructing apparatus 7 to extract the display range 9 from the photographing range 5*a* of the camera as an area for causing the main display 7*a* to display. As a result, the instructor 6 can confirm the operated target 3 with an appropriate size and appropriate resolution. The display range 8*a* of the mount type device 4 is an area corresponding to the visual field range of the worker 2. The worker 2 carries out the work while confirming an image in the display range 8*a* displayed on the display of the mount type device 4. The image in the display range 8*a* is also displayed on the sub display 7*b* to share the image between the instructor 6 and the worker 2. Further, an outer frame of the display range 8*a* is displayed on the main display 7*a*, whereby it is possible to easily confirm where the visual field of the worker is positioned in a wide range of work site.

The worker 2 may move the visual line during the work. The movement of the visual line may be inevitable in the work process, but in many cases, it is due to movement unrelated to the work process. As the visual field of the worker moves, the visual field range of the worker 2 also moves. For example, as illustrated in FIG. 2, as the center of the visual line in turn moves from A to B, C, and D, the visual field range in turn moves from 8a to 8b, 8c, and 8d. In accordance with the movements of these, the photographing range of the camera also moves in turn. For example, in a case where the center of the visual line moves to D, the photographing range of the camera becomes 5d.

In the present embodiment, the display range 9 of the main display 7a is fixed with respect to such a movement of the direction of the visual line. The operation instructing apparatus 7 corrects an image that is extracted from the photographed image of the camera in accordance with the movement of the direction of the visual line, and sets the display range 9 of the main display 7a. Thus, even in a case where the visual line of the worker in turn moves A, B, C, and D, the display range 9 of the main display 7a is fixed. This makes it possible for the instructor 6 to view a stable image. Note that the case where the display range 9 of the main display 7a is fixed is illustrated herein, but the operation instructing apparatus 7 may cause the display range 9 to follow the movement of the visual line of the worker 2 so long as it is inevitable in the work process and is movement that the instructor 6 can predict. In this case, by detecting in which direction the visual line was directed within a predetermined time range and causing the display range to follow the movement of the visual line of the worker 2 slowly in accordance with the detected direction instead of causing the display range to follow all the movements thereof, it is possible to suppress sickness of the instructor 6.

Figure 3:
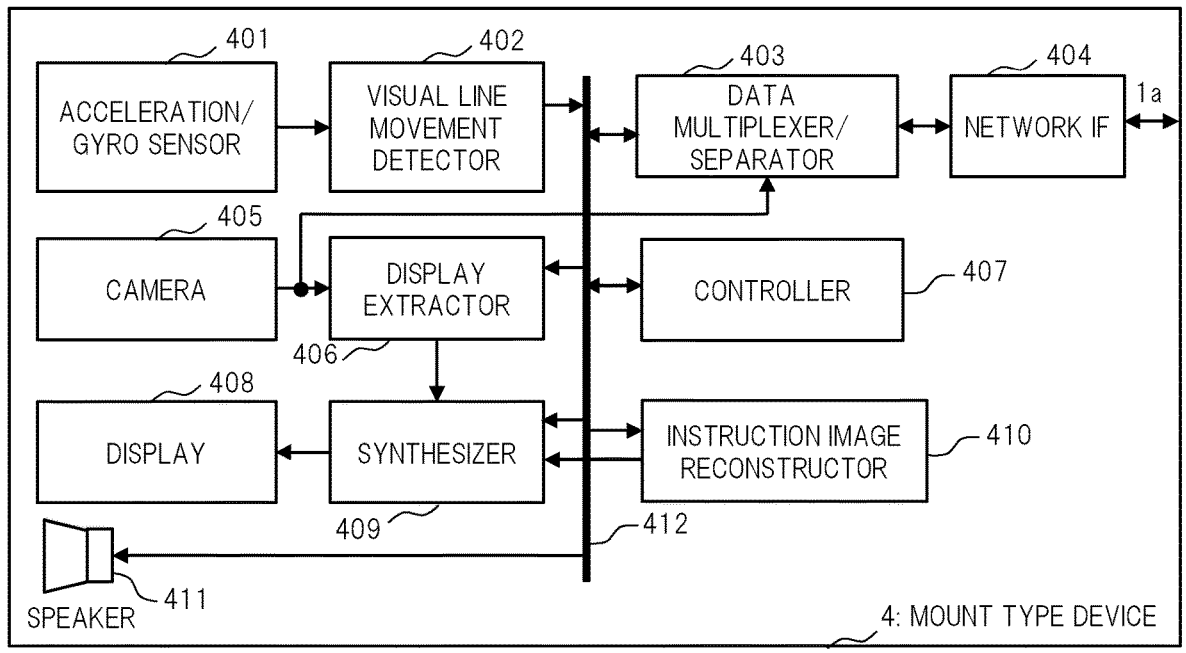
FIG. 3 is a block diagram illustrating one example of a configuration of a mount type device according to the first embodiment of the present invention.

FIG. 3 is a block diagram illustrating one example of a configuration of the mount type device according to the first embodiment of the present invention. In the mount type device 4 illustrated in FIG. 3, a reference numeral 401 denotes an acceleration/gyro sensor, a reference numeral 402 denotes a visual line movement detector, a reference numeral 403 denotes a data multiplexer/separator, a reference numeral 404 denotes a network IF (interface), a reference numeral 405 denotes a camera, a reference numeral 406 denotes a display extractor, a reference numeral 407 denotes a controller, a reference numeral 408 denotes a display (display for worker), a reference numeral 409 denotes a synthesizer, a reference numeral 410 denotes an instruction image reconstructor, a reference numeral 411 denotes a speaker, and a reference numeral 412 denotes an internal bus.

The acceleration/gyro sensor 401 is a group of sensors including an acceleration sensor, a gyro sensor, and the like. The acceleration/gyro sensor 401 uses the respective sensors to obtain the visual line of the worker 2 who wears the mount type device 4 as sensor information. The acceleration/gyro sensor 401 outputs the sensor information obtained by each of the sensors to the visual line movement detector 402.

The visual line movement detector 402 uses the sensor information outputted from the acceleration/gyro sensor 401 to detect the movement of the visual line of the worker 2. For example, the visual line movement detector 402 uses plural pieces of sensor information whose obtained times are different from each other to detect the movement of the visual line. The visual line movement detector 402 transmits the detected movement of the visual line to the data multiplexer/separator 403 via the internal bus 412 as visual line movement information.

The camera 405 photographs an area in a front direction of the worker 2 at a wider angle than the range in which the visual line of the worker 2 moves. A photographed image of the camera is transmitted to the display extractor 406 and the data multiplexer/separator 403. The display extractor 406 extracts an image of the visual field range of the worker 2 from the photographed image of the camera, and transmits the extracted image to the synthesizer 409. Note that a camera with a standard angle of view may be added to the mount type device 4 in order to obtain the image of the visual field range of the worker 2.

The instruction image outputted from the operation instructing apparatus 7 is received by the data multiplexer/separator 403 via the network IF 404 as the transmission/reception data 1a, and is transmitted from the data multiplexer/separator 403 to the instruction image reconstructor 410 via the internal bus 412. More specifically, for example, the data multiplexer/separator 403 separates data regarding the instruction image from the received transmission/reception data 1a, and transmits the separated data on the instruction image to the instruction image reconstructor 410. Further, for example, the data multiplexer/separator 403 separates data regarding voice of the instructor 6 from the received transmission/reception data 1a, and transmits data on the voice to the speaker 411.

The data multiplexer/separator 403 converts the photographed image of the camera into data, and transmits photographed image data to the operation instructing apparatus 7 via the network IF 404 as the transmission/reception data 1a. At that time, the data multiplexer/separator 403 may multiplex the visual line movement information of the worker 2 or voice data of the worker 2 with the photographed image data, and transmit data obtained by multiplexing these as the transmission/reception data 1a.

The instruction image reconstructor 410 reconstructs the instruction image from the received transmission/reception data 1a, and transmits the reconstructed instruction image to the synthesizer 409. The synthesizer 409 synthesizes the image extracted by the display extractor 406 and the instruction image reconstructed by the instruction image reconstructor 410; transmits the synthesized image to the display 408; and causes the display 408 to display an image obtained by superimposing the instruction image onto the image photographed by the camera 405 (or the extracted image).

The speaker 411 converts the voice data transmitted from the data multiplexer/separator 403 into voice, and outputs the voice of the instructor 6.

The controller 407 executes a control of each unit constituting the mount type device 4, assignment of the internal bus, and the like, and causes the mount type device 4 to execute respective processes. Each of the visual line movement detector 402, the data multiplexer/separator 403, the display extractor 406, the synthesizer 409, and the instruction image reconstructor 410 may be configured by hardware, or may be realized by software to be executed by the controller 407.

Figure 4:
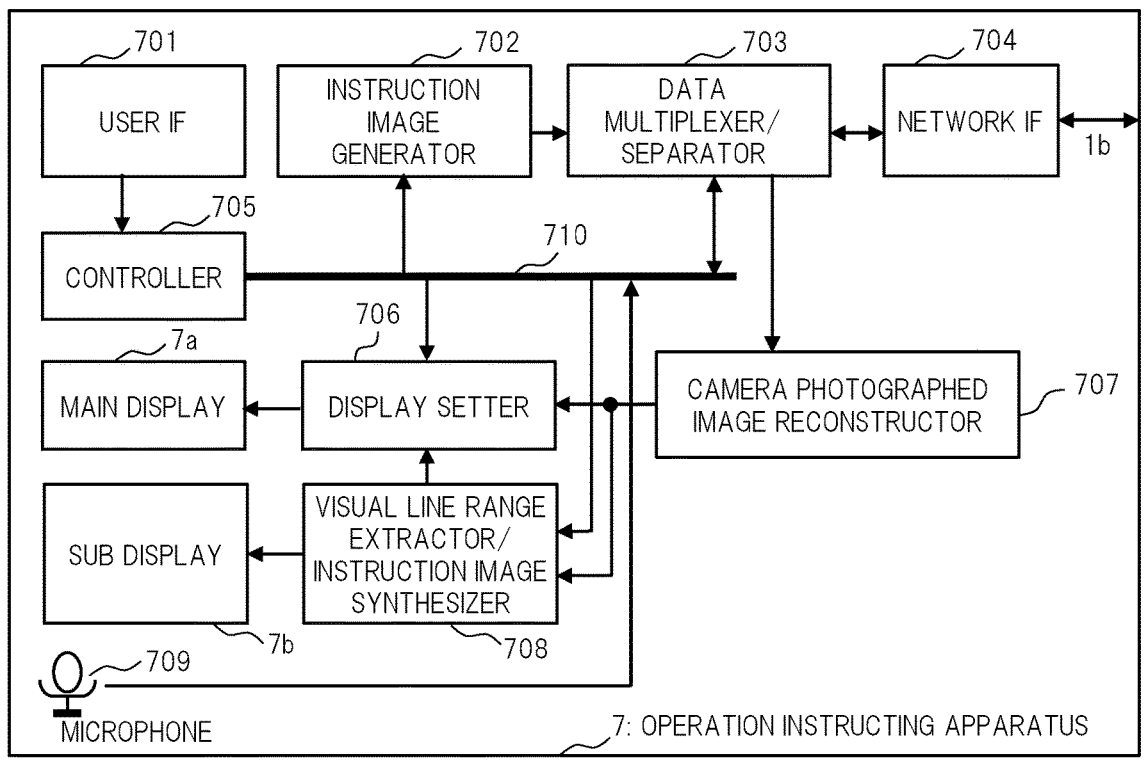
FIG. 4 is a block diagram illustrating one example of a configuration of an operation instructing apparatus according to the first embodiment of the present invention.

FIG. 4 is a block diagram illustrating one example of a configuration of the operation instructing apparatus according to the first embodiment of the present invention. In the operation instructing apparatus 7 illustrated in FIG. 4, a reference numeral 701 denotes a user IF, a reference numeral 702 denotes an instruction image generator, a reference numeral 703 denotes a data multiplexer/separator, a reference numeral 704 denotes a network IF, a reference numeral 705 denotes a controller, a reference numeral 7a denotes a main display, a reference numeral 706 denotes a display setter, a reference numeral 707 denotes a camera photographed image reconstructor, a reference numeral 7b denotes a sub display, a reference numeral 708 denotes a visual line range extractor/instruction image synthesizer (hereinafter, referred to as a "synthesizer"), a reference numeral 709 denotes a microphone, and a reference numeral 710 denotes an internal bus.

The user IF 701 is a functional block that receives an input from the instructor 6. The user IF 701 is an input device such as a keyboard, operation buttons, a mouse, or a touch panel, for example. The instructor 6 carries out an input operation via the user IF 701 to cause the operation instructing apparatus 7 to execute a predetermined process via the controller 705.

The instruction image generator 702 generates an instruction image suitable for the work process, and transmits instruction image data to the data multiplexer/separator 703. The instruction image data are transmitted to the network 1 via the network IF 704 as the transmission/reception data 1*b*. At that time, for example, the data multiplexer/separator 703 may multiplex the instruction image data, the voice data of the instructor 6, and the like, and transmit the multiplexed data via the network IF 704 as the transmission/reception data 1*b*.

The data multiplexer/separator 703 separates photographed image data from the transmission/reception data 1*b* received from the mount type device 4, and transmits the photographed image data to the synthesizer 708 via the internal bus 710. Further, the data multiplexer/separator 703 separates visual line movement information of the worker 2 from the received transmission/reception data 1*b*, and transmits the separated visual line movement information to the display setter 706, the synthesizer 708, and the like. Further, the data multiplexer/separator 703 may separate the voice data of the worker 2 from the received transmission/reception data 1*b*, and transmit the separated voice data to a speaker (not illustrated in the drawings).

The photographed image data transmitted from the data multiplexer/separator 703 are reconstructed to photographed image by the camera photographed image reconstructor 707. The reconstructed camera photographed image is transmitted to the display setter 706 and the synthesizer 708.

The controller 705 executes a control of each unit constituting the operation instructing apparatus 7, assignment of the internal bus 710, and the like, and causes the operation instructing apparatus 7 to execute respective processes. Further, the controller 705 sets an area of the photographed image to be extracted by the display setter 706, and transmits a setting value to the display setter 706.

The display setter 706 extracts an image with an area to be displayed on the main display 7*a* (a first image) from the camera photographed image in accordance with the setting value transmitted from the controller 705. At this time, the movement of the visual line is corrected for the extracted image using the visual line movement information. As explained using FIG. 2, the display setter 706 fixes the display range 9 of the image that the main display 7*a* is caused to display even in a case where the visual line of the worker moves.

The synthesizer 708 extracts an image of the visual field range of the worker 2 (a second image) from the photographed image, and synthesizes the image and an instruction image to cause the sub display 7*b* to display the image obtained by synthesizing these. The movement of the visual line for the image that is extracted by the synthesizer 708 may also be corrected using the visual line movement information. The microphone 709 converts the voice of the instructor 6 into voice data, and transmits the voice data to the data multiplexer/separator 703.

Note that a display image of the sub display 7*b* may be one obtained by synthesizing a photographed image of a camera with a standard angle of view, which is added to the mount type device 4, and the instruction image. Further, the display image generated by the synthesizer 708 may be displayed on the main display 7*a*. In this case, the sub display 7*b* may not be provided. Further, the main display 7*a* may display the image generated by the display setter 706 and the image generated by the synthesizer 708 by a picture-in-picture method, and the instructor 6 may arbitrarily switch the displays and display the images.

Figure 5:
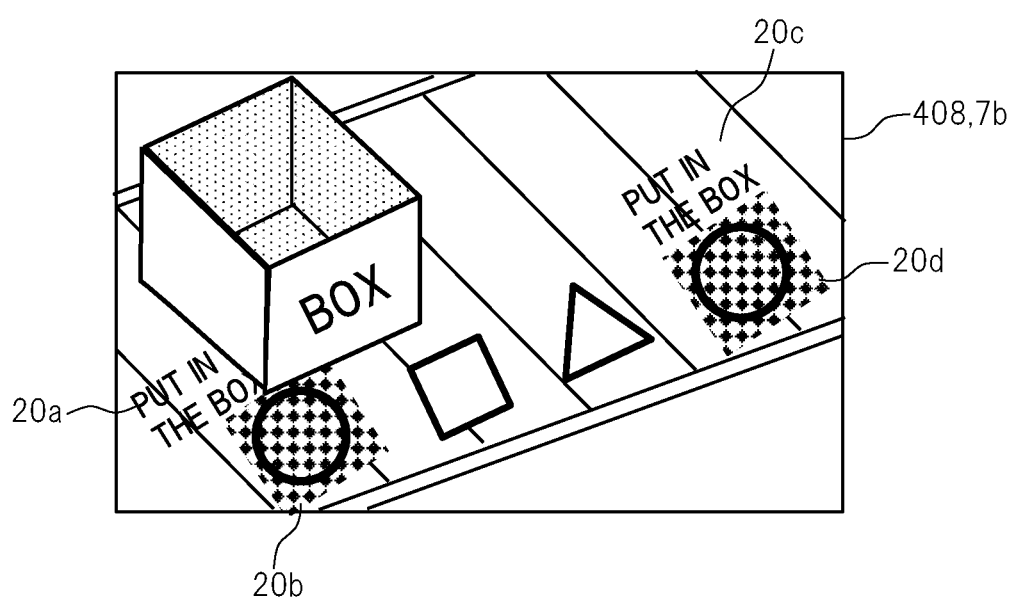
FIG. 5 is a view illustrating one example of an image in a visual field range of a worker.

FIG. 5 is a view illustrating one example of an image in a visual field range of a worker. More specifically, FIG. 5 illustrates an image that is to be displayed on the display 408 of the mount type device 4 and the sub display 7*b* of the operation instructing apparatus 7. In FIG. 5, reference numerals 20*a* to 20*d* denote instruction images, and the instruction images 20*a* to 20*d* are synthesized and displayed on a visual field image of the worker 2. The instruction images 20*a*, 20*c* are images for conveying the instruction content in characters, and the instruction image 20*b*, 20*d* are images for highlighting work targets. The worker 2 can easily understand the work content by viewing the instruction image.

Figure 6:
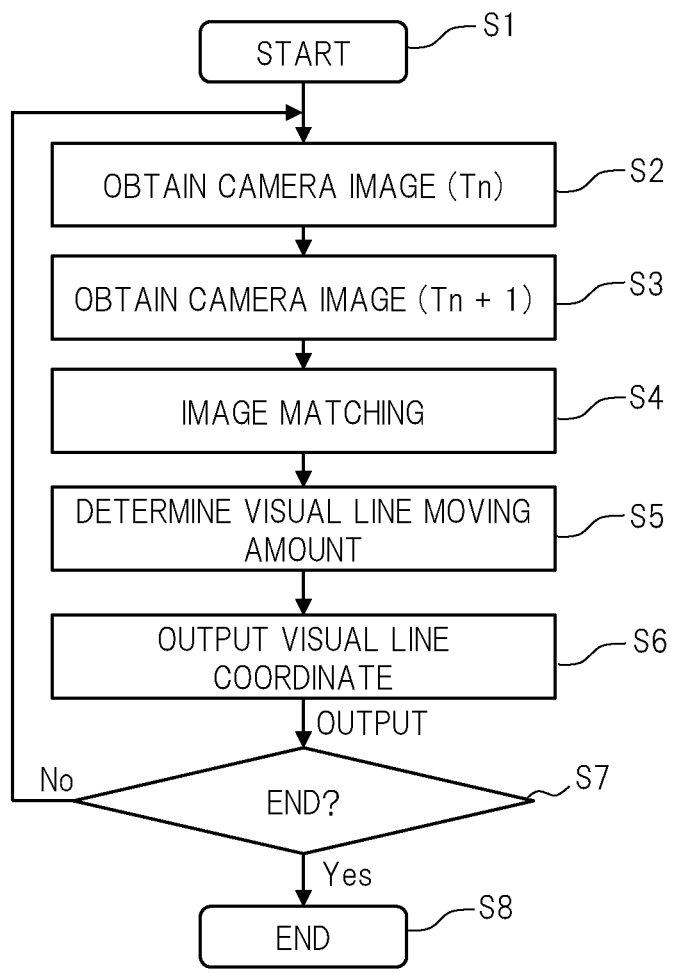
FIG. 6 is a flow diagram illustrating a detecting process of movement of a visual line of the worker.

FIG. 6 is a flow diagram illustrating a detecting process of movement of a visual line of a worker. As explained using FIG. 3, the movement of the visual line of the worker 2 is detected using the acceleration/gyro sensor 401 and the visual line movement detector 402. FIG. 6 illustrates a method of substituting this, that is, a flow of detecting the movement of the visual line using the photographed image in the operation instructing apparatus 7. This makes it possible to use the mount type device 4 by which the cost is reduced by omitting the group of sensors.

When detection of movement of a visual line is started (S1), the operation instructing apparatus 7 respectively obtains photographed images at times Tn, Tn+1 (S2 to S3). In a case where the worker 2 moves the visual line, a photographing range of a photographed image to be photographed by a camera worn by the worker 2 also moves. The operation instructing apparatus 7 evaluates how much the image at the time Tn+1 should be shifted on the basis of the image at the time Tn by executing image matching, for example (S4). An image shift amount and an image shift direction executed at Step S4 become visual line movement information that indicates the movement of the visual line.

The operation instructing apparatus 7 executes filtering such as removal of abnormal values for the visual line movement information obtained at Step S4, and determines a visual line moving amount (S5). The operation instructing apparatus 7 calculates and outputs a relative coordinate value corresponding to the visual line moving amount (S6). By outputting the relative coordinate value, it becomes possible to output the display range 9 of operation instructing apparatus in the same display range even though the direction of the camera changes.

After the relative coordinate value at Step S6 is outputted, the operation instructing apparatus 7 determines whether the detecting process of the movement of the visual line is continued or not (S7). In a case where the detecting process of the movement of the visual line is to be continued (No), the operation instructing apparatus 7 repeats the processes at Steps S2 to S6. On the other hand, in a case where the detecting process of the movement of the visual line is not to be continued (Yes), the operation instructing apparatus 7 terminates the detecting process of the movement of the visual line (S8). Note that the flow of FIG. 6 may be executed by the controller 705, for example, or may be executed by another component.

Figure 7:
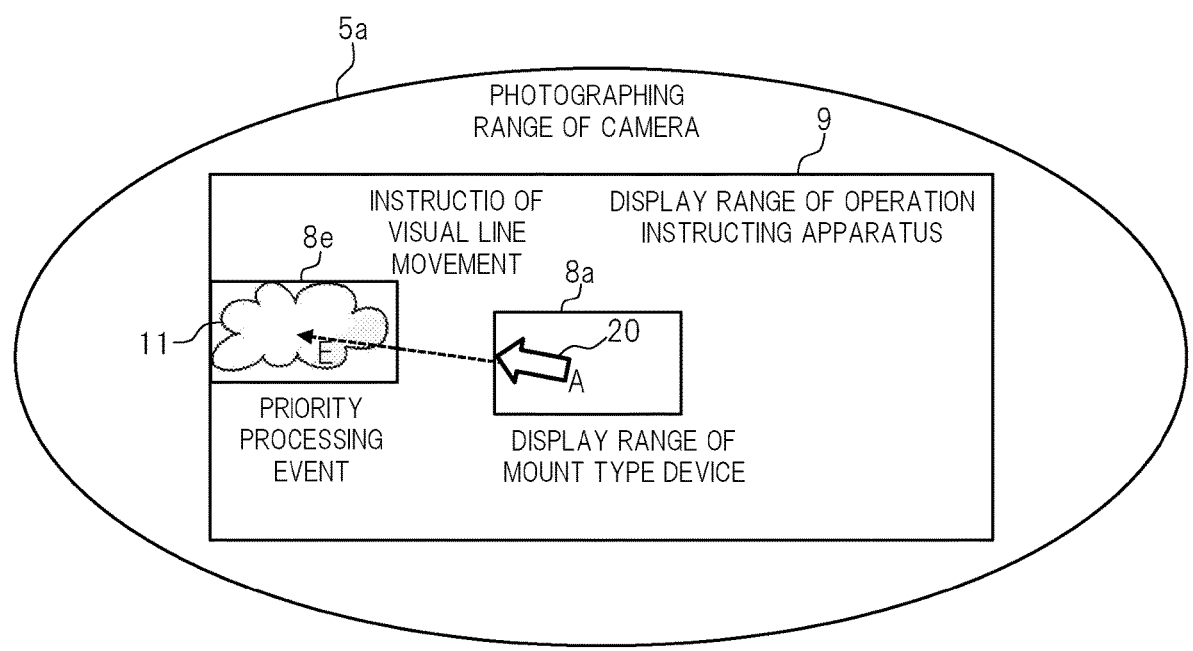
FIG. 7 is a view for explaining another example of the operation of the remote operation instructing system according to the first embodiment of the present invention.

FIG. 7 is a view for explaining another example of an operation of the remote operation instructing system according to the first embodiment of the present invention. FIG. 7 illustrates an operation in a case where a priority processing event occurs outside the visual field range of the worker 2. The photographing range 5a of the camera 405, the display range 9 of the main display 7a, and the display ranges 8a, 8e of the display 408 of the mount type device 4 are illustrated in FIG. 7.

When the visual line of the worker 2 is positioned at a point A, an image of the display range 8a is displayed on the display 408. Further, an image of the display range 9 is displayed on the main display 7a in the operation instructing apparatus 7.

At this time, when a priority processing event 11 appears in the display range 8e outside the visual field of the worker 2, the instructor 6 recognizes the priority processing event 11 on the screen of the main display 7a. Then, the instructor 6 creates an instruction image 20, and causes the operation instructing apparatus 7 to transmit the created instruction image 20 to the mount type device 4. The mount type device 4 separates data regarding the instruction image 20 from the received transmission/reception data 1a, and synthesizes the instruction image 20 to the display range 8a of the display 408 using the separated data.

The instruction image 20 may be any one that causes the worker 2 to direct his or her visual line toward the priority processing event 11 outside the visual field range. The instruction image 20 illustrated in FIG. 7 is an image of an arrow toward the central point E of an area including at least a part of the priority processing event 11, and encourages the worker 2 to quickly address the priority processing event 11.

Figure 8:
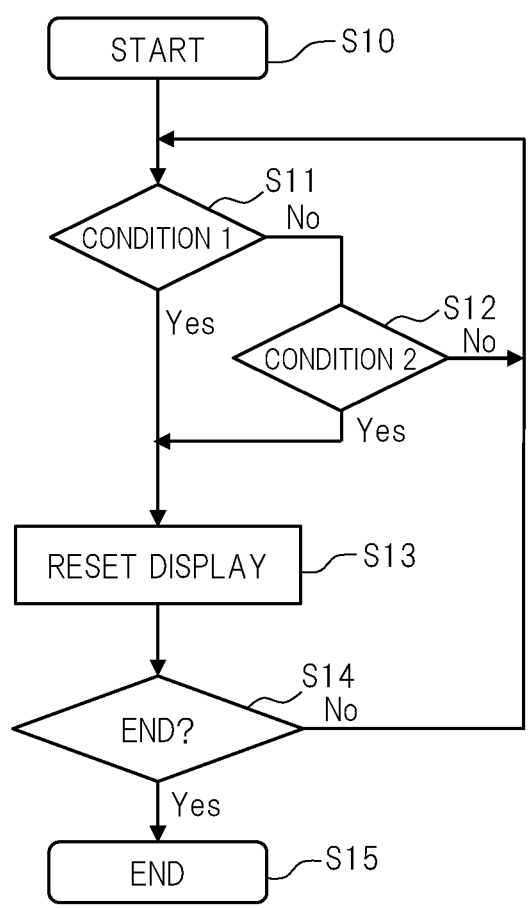
FIG. 8 is a view illustrating a flow related to setting of a display range in the operation instructing apparatus.

FIG. 8 is a view illustrating a flow related to setting of a display range in the operation instructing apparatus. In the flow illustrated in FIG. 8, an image of a visual line range of the worker 2 always exists within a display range of the main display 7a in the operation instructing apparatus 7, and the display range of the main display 7a falls within the photographing range of the camera 405.

When the processes illustrated in FIG. 8 are started (S10), as a condition 1, a possibility that a display area of the mount type device 4, that is, a part of an image to be displayed on the sub display 7b protrudes toward the outside of the display range of the main display 7a is evaluated (S11). In a case where it is determined at Step S11 that there is no possibility that the part of the image to be displayed on the sub display 7b protrudes toward the outside of the display range of the main display 7a (No), a process at Step S12 is executed. At Step S12, as a condition 2, a possibility that apart of the display range of the main display 7a protrudes toward the outside of the photographing range of the camera 405 is evaluated.

In a case where it is determined that there is the possibility that the part of the image to be displayed on the sub display 7b protrudes toward the outside of the display range of the main display 7a (S11, Yes), or in a case where it is determined that there is the possibility that the part of the display range of the main display 7a protrudes toward the outside of the photographing range of the camera 405 (S12, Yes), it means that a relationship among the photographing range of the camera 405, the display range of the main display 7a, and the display range of the display 408 in the mount type device 4 is not in an appropriate state.

In this case, resetting of the display ranges is executed (S13). For example, the display range of the main display 7a is adjusted so that the center of the display range of the main display 7a and the center of the visual line of the worker 2 coincide with each other. Since the center of the visual line of the worker 2 and the center of the photographing range of the camera 405 coincide with each other, the centers of the photographing range of the camera 405, the display range of the main display 7a, and the display range of the display 408 coincide with each other, a relationship of "(the photographing range of the camera)>(the display range of the main display 7a)>(the display range of the display 408)" is secured. Note that the mark ">" indicates that there is an inclusion relationship. However, if the display range of the main display 7a is reset immediately by following the movement of the visual line, the display range moves when the worker 2 moves his or her head or moves the visual line. Therefore, the instructor may feel unpleasant sickness. For that reason, resetting of the display range may be executed slowly with respect to the movement of the visual line, or may be executed by calculating an average moving amount for a certain period of time or longer.

On the other hand, in a case where it is determined at Step S12 that there is no possibility that the part of the display range of the main display 7a protrudes toward the outside of the photographing range of the camera 405 (No), the process at Step S11 is executed again.

At Step S14, it is determined whether reset processing for the display range is to be terminated or not. In a case where it is determined that the reset processing for the display range is to be continued (No), the processes at Step S11 to S13 are executed again. On the other hand, in a case where it is determined that the reset processing for the display range is to be terminated (Yes), the reset processing for the display range is terminated (S15).

Figure 9:
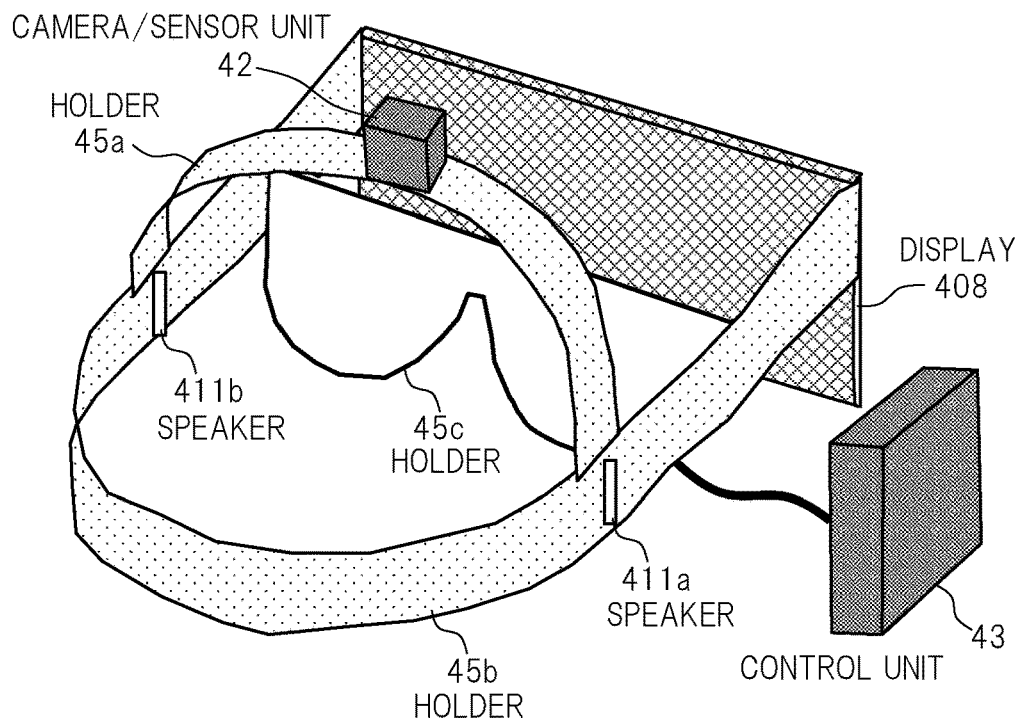
FIG. 9 is an outline drawing illustrating one example of the configuration of the mount type device.

FIG. 9 is an outline drawing illustrating one example of a configuration of the mount type device. In FIG. 9, a reference numeral 42 denotes a camera/sensor unit, a reference numeral 43 denotes a control unit, reference numerals 411a, 411b denote speakers, and reference numerals 45a, 45b, 45c denote holders.

The holder 45a is in contact with the crown, the holder 45b is in contact with the occipital region and the left and right temporal regions, and the glasses-shaped holder 45c is in contact with the nose. The holders 45a to 45c allow the mount type device 4 to be attached to the head of the worker 2.

The camera/sensor unit 42 is a unit that includes the acceleration/gyro sensor 401 and the camera 405, for example. The camera/sensor unit 42 is configured to photograph the front of the worker 2, and measure movement of the head of the worker 2 to obtain sensor information regarding the movement of the visual line.

Alternatively, the camera/sensor unit 42 may detect the direction of the visual line directly from an angle of the pupil by a tracking technique for detecting a direction of a visual line. As illustrated in FIG. 9, the camera/sensor unit 42 may be provided on the holder 45a for the crown, or may be provided at any other place.

The speakers 411a, 411b are provided at portions on the holder 45b near the respective ears of the worker 2. The display 408 is disposed in front of the worker 2, and the worker 2 views an image displayed on the display 408 through the glasses-shaped holder 45c.

The control unit 43 is a unit that includes the visual line movement detector 402, the data multiplexer/separator 403, the network IF 404, the display extractor 406, the controller 407, the synthesizer 409, the instruction image reconstructor 410, and the like, which are illustrated in FIG. 3, for example. Note that the display 408 and the control unit 43 may be configured integrally. In this case, a smartphone may be used, for example.

Figure 10:
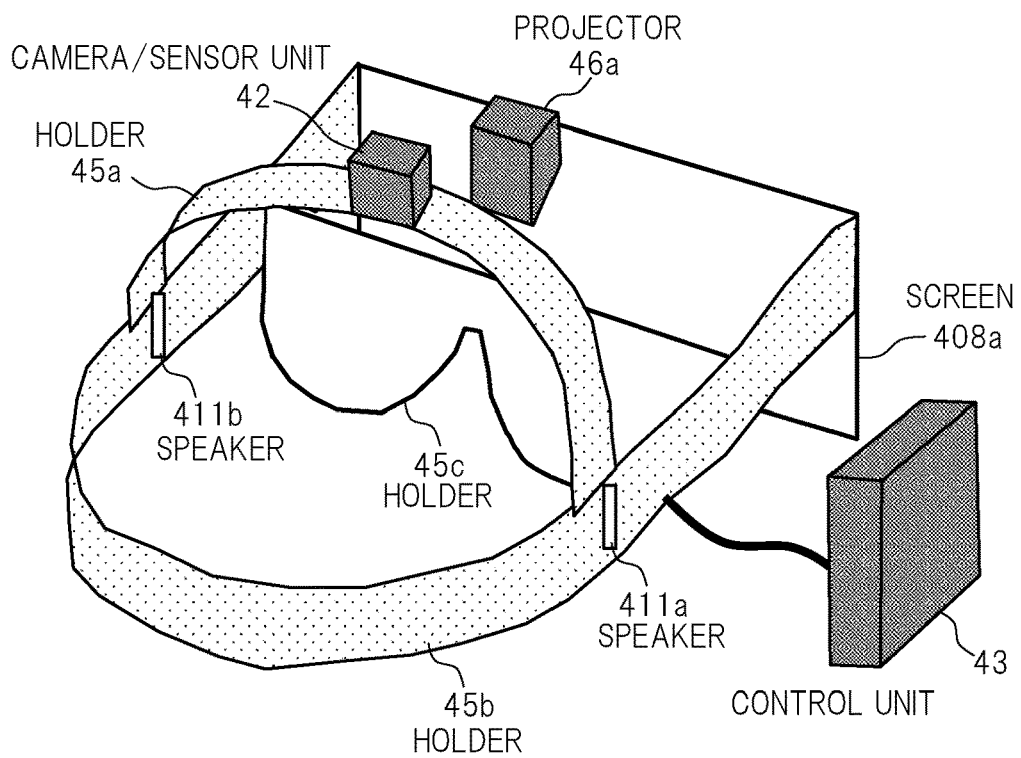
FIG. 10 is an outline drawing illustrating another example of the configuration of the mount type device.

FIG. 10 is an outline drawing illustrating another example of the configuration of the mount type device. In FIG. 10, the same reference numerals as those in FIG. 9 are respectively assigned to the same components as those in FIG. 9. In FIG. 10, a projector-type display composed of a projector 46a and a screen 408a is provided in place of the display 408.

The screen 408a is configured by a transmissive screen, for example. In this case, the worker 2 can confirm an actual scene of his or her visual field range through the screen. An image projected on the screen 408a by the projector 46a is the instruction image from the operation instructing apparatus 7, for example. The worker 2 can view the visual field image and the instruction image by synthesizing them on the screen 408a. For this reason, the synthesizer 409 may not be provided in the configuration illustrated in FIG. 10.

Figure 11:
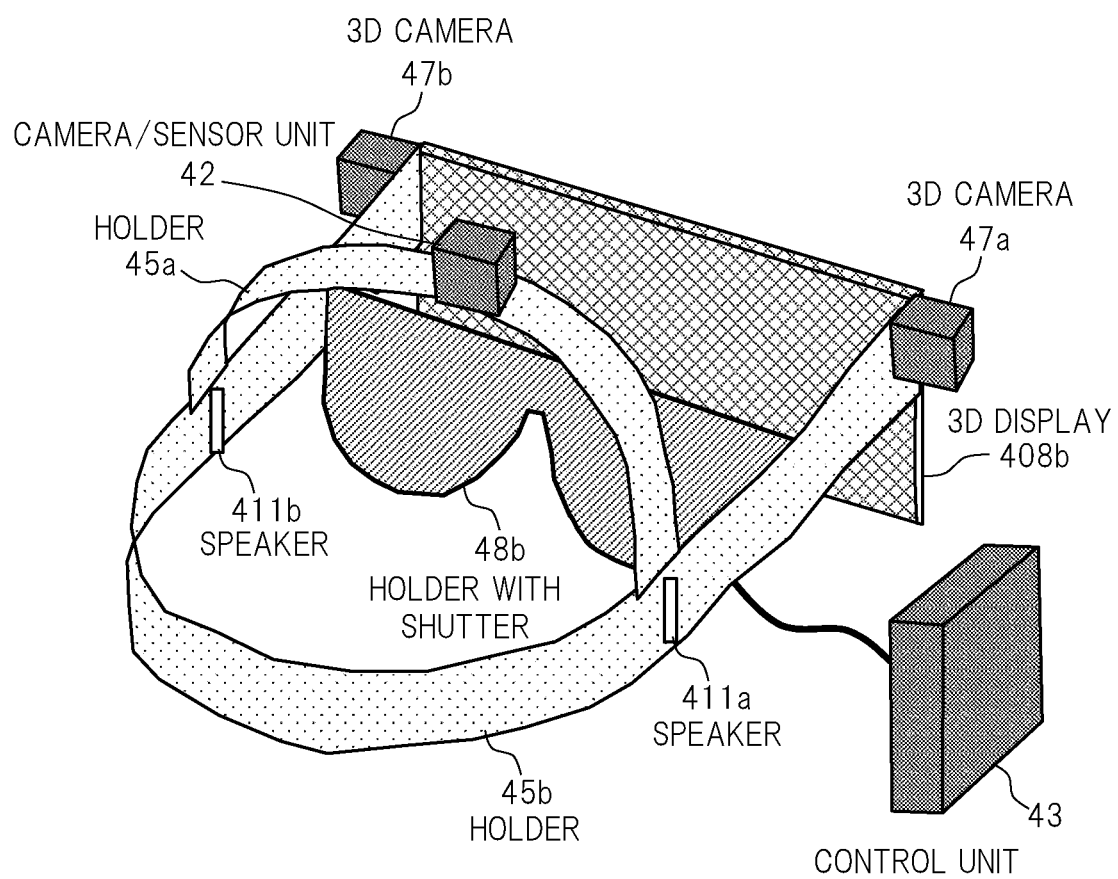
FIG. 11 is an outline drawing illustrating still another example of the configuration of the mount type device.

FIG. 11 is an outline drawing illustrating still another example of the configuration of the mount type device. In FIG. 11, the same reference numerals as those in FIG. 9 are also assigned to the same components as those in FIG. 9, respectively. In FIG. 11, 3D cameras 47a, 47b are provided. Further, in FIG. 11, a 3D display 408b is provided in place of the display 408. Further, a holder with shutter 48b is provided in place of the holder 45c.

The 3D camera 47a is provided on the holder 45b at a right side of the worker 2. The 3D camera 47b is provided on the holder 45b at a left side of the worker 2. The 3D cameras 47a, 47b respectively photograph images having a parallax in a right-and-left direction each other, and output the photographed images to the 3D display 408b. For example, the 3D display 408b alternately displays the photographed images of the 3D cameras 47a, 47b in a time-division manner.

The holder with shutter 48b has a liquid crystal shutter, for example. The holder with shutter 48b repeats ON/OFF of the shutter in accordance with the right and left photographed images displayed on the 3D display 408b. More specifically, the holder with shutter 48b controls the shutter so that the 3D display 408b can be viewed by a right eye when the right image of the 3D camera 47a is displayed, and controls the shutter so that a left eye can view the 3D display 408b when the left image of the 3D camera 47b is displayed. The control of the shutter allows the worker 2 to view the 3D image.

According to the configuration illustrated in FIG. 11, the worker 2 can view the foreground thereof as a 3D image, and also obtain depth information of the image. For example, when the 3D image (the photographed images of the 3D cameras 47a, 47b) is transmitted to the operation instructing apparatus 7, the instructor 6 can create a 3D instruction image in consideration of the depth of a work target. If the depth information on such an image is fed back to the worker 2, the accuracy of the work is improved.

Further, the 3D display may be provided in the operation instructing apparatus 7 as the sub display 7b in correspondence with the configuration illustrated in FIG. 11. In this case, a 3D image of the 3D camera is supplied to the synthesizer 708 in place of the photographed images of the cameras.

Main Effects by the Present Embodiment

According to the present embodiment, an image having a wider range than the visual line range of the worker 2 is displayed on the main display 7a. According to this configuration, even though the visual line of the worker 2 moves, the influence on the image displayed on the main display 7a is suppressed. Therefore, the instructor 6 does not feel unpleasant sickness.

Further, according to the present embodiment, the instructor 6 can create the instruction image while viewing the image of the visual field range of the worker, which is displayed on the sub display 7b. Further, the instruction image is superimposed and displayed on the display 408 in the mount type device 4. According to this configuration, the instructor 6 can accurately carry out an instruction to the worker 2 while viewing the wide range of the work site.

Further, according to the present embodiment, the controller 705 sets an area of the photographed image that is to be extracted. According to this configuration, it becomes possible to appropriately change the area of the image displayed on the main display 7a in consideration of a usage situation thereof.

Further, according to the present embodiment, even in a case where the visual line of the worker 2 moves, the area of the photographed image displayed on the main display 7a is fixed. According to this configuration, the photographed image displayed to the instructor 6 does not fluctuate in response to the movement of the visual line of the worker 2. As a result, the instructor 6 is less likely to feel unpleasant sickness.

Further, according to the present embodiment, in a case where the priority processing event 11 occurs outside the visual field range of the worker 2, the instructor 6 generates the instruction image to cause the worker 2 to direct his or her visual line toward the priority processing event 11. According to this configuration, the worker 2 can direct his or her visual line toward the priority processing event 11, and address the priority processing event 11 quickly.

Second Embodiment

Next, a second embodiment will be described. Note that hereinafter, explanation for the portions that overlap with the embodiment described above will be omitted in principle.

Figure 12:
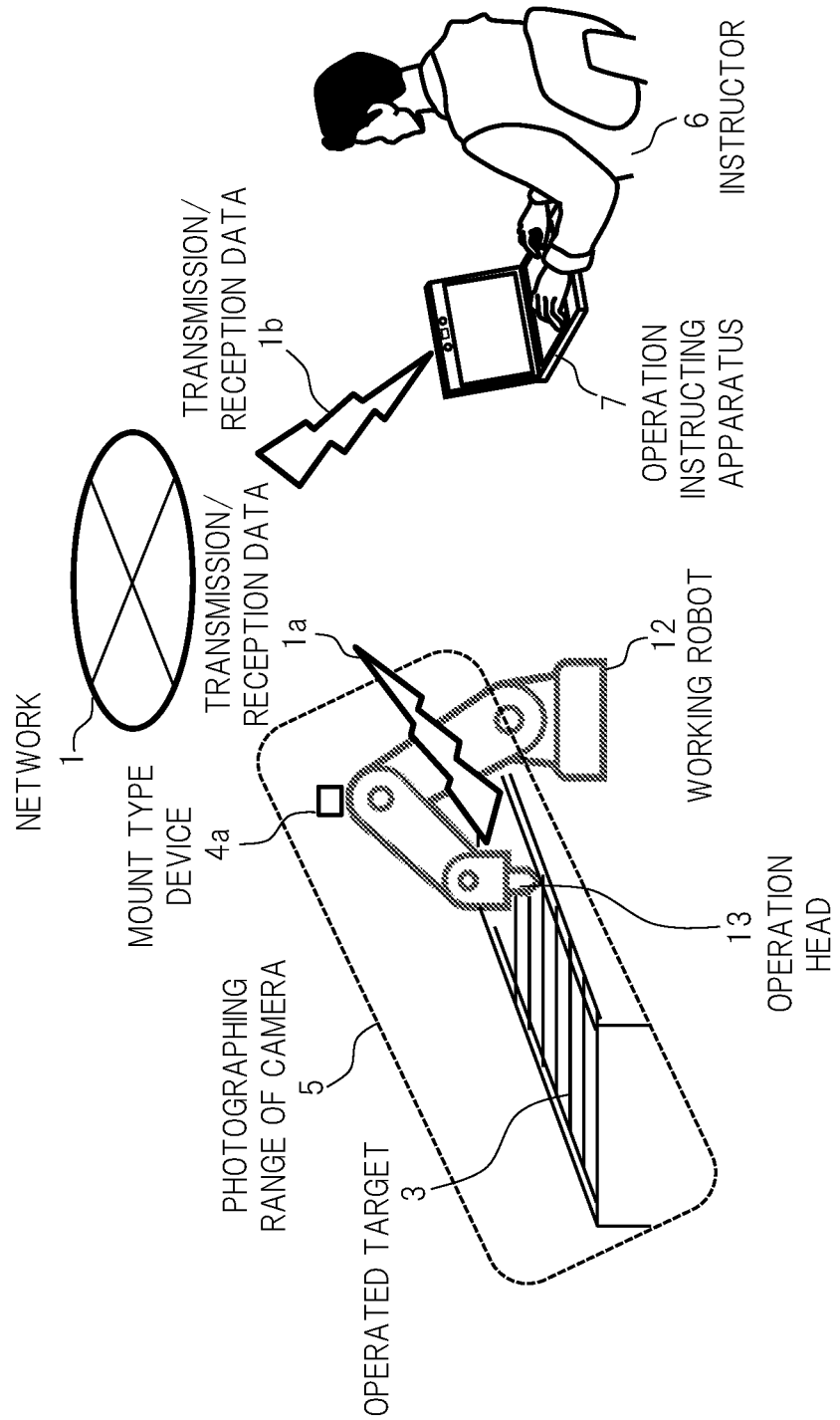
FIG. 12 is a view for explaining an outline of a remote operation instructing system according to a second embodiment of the present invention.

FIG. 12 is a view for explaining an outline of a remote operation instructing system according to the second embodiment of the present invention. In FIG. 12, a working robot 12 is used in place of a worker 2. An instructor 6 carries out a remote operation for the working robot 12 to carry out work. An operation head 13 is attached to a tip of the working robot 12. Positioning for the working robot 12 is carried out, and the working robot 12 carries out predetermined work for the operated target 3 using the operation head 13.

A mount type device 4a is installed at a position where the entire working range of the operation head 13 can be viewed. The mount type device 4a is configured so that a display 408 is omitted from amount type device 4. The mount type device 4a includes a wide-angle camera, and transmits, to an operation instructing apparatus 7, photographed image data on a photographed image of a work site, which is photographed by the camera, and movement information of the working robot. Of course, the installation position of the mount type device 4a is not limited to this position.

An image extracted from the received photographed image is displayed on a main display 7a or a sub display 7b of the operation instructing apparatus 7. At this time, a display setter 706 executes correction for the image extracted from the photographed image (a third image) by using the movement information of the working robot 12.

The instructor 6 generates an instruction of positioning for the working robot 12 or a work instruction for the operation head 13 while viewing the displayed image. More specifically, in the present embodiment, the instruction image generator 702 illustrated in FIG. 4 serves as a work instruction generator, and the work instruction generator generates a work instruction on the basis of an input operation by the instructor 6. By transmitting the generated work instruction or the like, a remote operation for the working robot 12 is carried out.

Note that the photographed image may be transmitted from the mount type device 4a to the operation instructing apparatus 7, or may be transmitted via the working robot 12. Further, the work instruction may be transmitted to the working robot 12 via the mount type device 4a, or may be transmitted directly to the working robot 12.

According to the present embodiment, it becomes possible to use the working robot in the remote operation instructing system.

Third Embodiment

Figure 13:
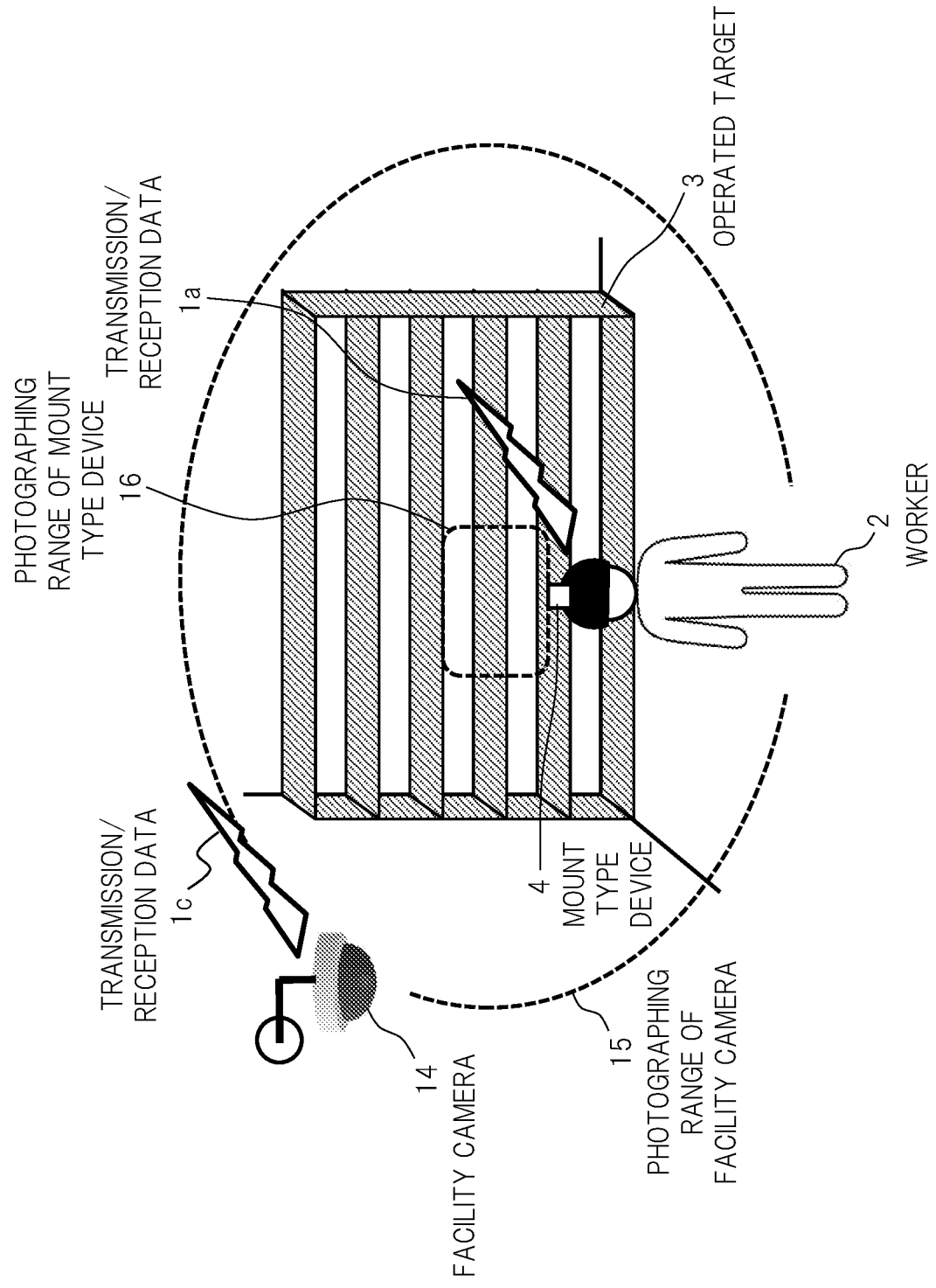
FIG. 13 is a view for explaining an outline of a remote operation instructing system according to a third embodiment of the present invention.

Next, a third embodiment will be described. FIG. 13 is a view for explaining an outline of a remote operation instructing system according to the third embodiment of the present invention. FIG. 13 illustrates only a worker site including a work site. The worker site is facility in a limited area such as a warehouse or a hospital, for example. A facility camera 14 for monitoring a state of the facility is installed in the worker site. The facility camera 14 may be provided newly for the remote operation instructing system. For example, a camera installed for another purpose, such as a security camera, may be used as the facility camera 14. The facility camera 14 photographs the inside of the facility at a wide angle to obtain a photographed image having a photographing range 15. The facility camera 14 has a network function, and transmits the photographed image to an operation instructing apparatus 7 via a network 1 as transmission/reception data 1c.

The worker 2 wears a mount type device 4 that has a camera 405 with a standard angle of view, for example. The camera 405 generates a photographed image having a photographing range 16, and transmits photographed image data to the operation instructing apparatus 7 as transmission/reception data 1a.

The operation instructing apparatus 7 uses the photographed image having the photographing range 15, which is transmitted from the facility camera 14, and the photographed image having the photographing range 16, which is transmitted from the mount type device 4 to detect a visual line of the worker 2, that is, a position of the photographing range 16 in the photographing range 15.

The center of the photographing range 15 of the facility camera 14 does not almost match with the center of the photographing range 16 of the camera 405 in the mount type device 4. For this reason, in order to detect the position of the photographing range 16 in the photographing range 15, it is necessary to execute processing of detecting the position of the center of the photographing range 16 in the photographing range 15 of the facility camera.

Figure 14:
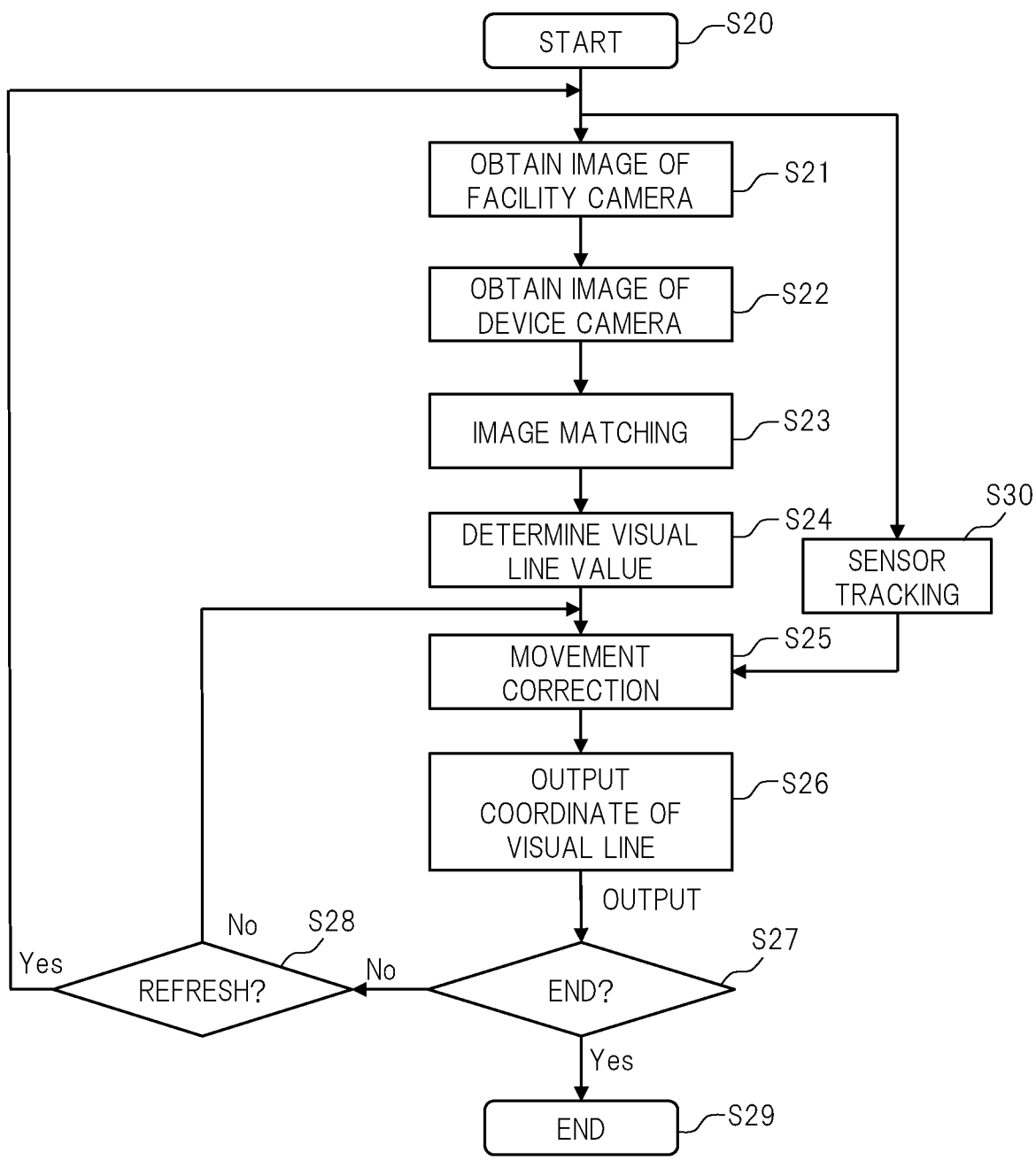
FIG. 14 is a flow diagram illustrating one example of processing of detecting a visual line of a worker in a photographing range of a facility camera.

Hereinafter, the processing of detecting the visual line of the worker (that is, the photographing range 16) will be described with reference to FIG. 14. FIG. 14 is a flow diagram illustrating one example of the processing of detecting the visual line of the worker in the photographing range of the facility camera. Note that the processing according to FIG. 14 may be executed by a controller 705 of the operation instructing apparatus 7, or may be executed by the other functional block.

When the processing of detecting the visual line of the worker is started (S20), the operation instructing apparatus 7 obtains a photographed image of the facility camera 14 (S21), and obtains a photographed image of the mount type device 4 (S22). In a case where the worker 2 moves his or her visual line, the photographing range 16 of the camera 405 in the mount type device 4 moves, but the photographing range 15 of the facility camera 14 does not move. Therefore, the operation instructing apparatus 7 executes an image matching process between the photographed image having the photographing range 16 and the photographed image having the photographing range 15 (S23), and detects a position of the photographing range 15 in the photographing range 16 as a visual line value indicating the visual line of the worker 2 (S24). For example, the center of the photographing range 16 may be detected as the visual line of the worker 2, and a coordinate position of the center of the photographing range 16 may be detected as the visual line value.

Movement of the visual line of the worker 2 can be racked by a group of sensors mounted on the mount type device 4 (S30). Therefore, the operation instructing apparatus 7 uses the visual line value obtained by the calculation at Step S24 as an initial value and sensor information obtained at Step S30 to execute movement correction for tracking the movement of the visual line (S25), and outputs the visual line value (the coordinate position) of the photographing range 16 in the photographing range 15 of the visual line (S26).

Then, it is determined whether a visual line detecting process is to be terminated or not (S27). In a case where the visual line detecting process is continued (No), it is determined whether a refreshing process is to be executed or not (S28). In a case where it is determined that the refreshing process is to be executed (Yes), the process at Step S21 is executed. On the other hand, in a case where it is determined that the refreshing process is not to be executed (No), the process at Step S25 is executed. In a case where it is determined at Step S27 that the visual line detecting process is to be terminated (No), the visual line detecting process is terminated (S8).

According to the present embodiment, the remote operation instructing system utilizing the facility camera 14 can be realized. In addition, it is also possible to use an existing camera as the facility camera 14.

Fourth Embodiment

Figure 15:
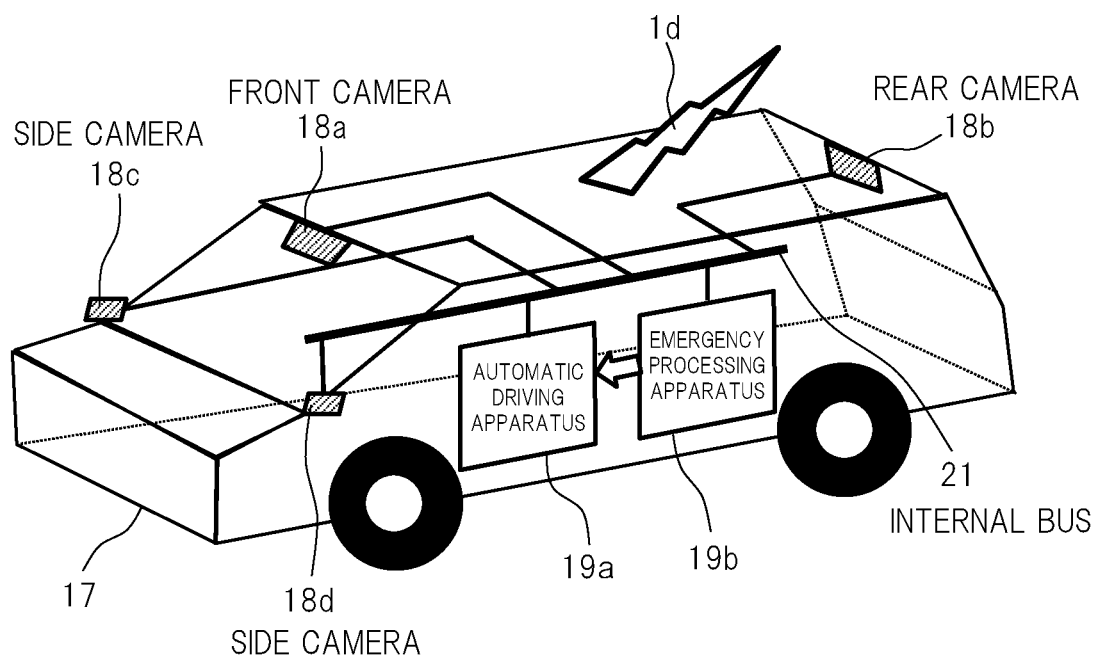
FIG. 15 is a view for explaining an outline of a remote operation instructing system according to a fourth embodiment of the present invention.

Next, a fourth embodiment will be described. FIG. 15 is a view for explaining an outline of a remote operation instructing system according to the fourth embodiment of the present invention. FIG. 15 illustrates an automobile (a mobile object) 17 provided with an automatic driving apparatus 19a in place of a worker. The automobile 17 includes a front camera 18a, a rear camera 18b, and side cameras 18c, 18d. The front camera 18a, the rear camera 18b, and the side cameras 18c, 18d respectively photograph corresponding areas to generate photographed images thereof. The automobile 17 is connected to a network 1 to transmit these photographed image data to the operation instructing apparatus 7 as transmission/reception data 1d. Note that a visual line of the automobile 17 (which corresponds to the worker) when moving forward is located in a photographing area of the front camera 18a. Further, the visual line of the automobile (which corresponds to the worker) when moving backward may be located in a photographing area of the rear camera 18b.

For example, these photographed images are displayed on a display in the operation instructing apparatus 7. This allows an instructor 6 to observe a wide area corresponding to a work area (for example, the entire circumference of the automobile 17) while viewing the photographed images displayed on the display.

When an emergency situation is detected, the instructor 6 transmits an emergency processing operation command, and an emergency processing apparatus 19b and the automatic driving apparatus 19a cause the automobile 17 to stop in a safe zone such as a roadside zone. The emergency processing operation command is generated by an emergency processing command unit (not illustrated in the drawings). For example, a function of the emergency processing command unit may be possessed by the instruction image generator 702 illustrated in FIG. 4, or the emergency processing command unit may be provided separately from the instruction image generator 702. Note that the automobile 17 is exemplified as the mobile object, but the mobile object is not limited to this.

According to the present embodiment, it is possible to apply the remote operation instructing system to the automobile 17 provided with the automatic driving apparatus 19a, and this makes it possible to improve safety of the automobile 17.

In this regard, the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby. Note that each member illustrated in the drawings and a relative size thereof are simplified and idealized in order to clearly explain the present invention, and each member may have a more complex shape on implementation thereof.

Further, apart or the whole of each component may be implemented by hardware, for example, by designing an integrated circuit. Further, a microprocessor unit, a CPU, or the like may interpret and execute an operation program, each component may be implemented by software. Further, the implementation range of the software is not limited, and the hardware and the software may be used together.

REFERENCE SIGNS LIST

1 . . . network, 1a to 1d . . . transmission/reception data, 2 . . . worker, 3 . . . operated target, 4 . . . mount type device, 5, 5a, 5b . . . photographing range, 6 . . . instructor, 7 . . . operation instructing apparatus, 7a . . . main display, 7b . . . sub display, 8a to 8e photographing range, 9 . . . display range, 401 . . . acceleration/gyro sensor, 402 . . . visual line movement detector, 403 . . . data multiplexer/separator, 404 . . . network IF, 405 . . . camera, 406 . . . display extractor, 407 . . . controller, 408 . . . display, 409 . . . synthesizer, 410 . . . instruction image reconstructor, 411 . . . speaker, 412 . . . internal bus, 701 . . . user IF, 702 . . . instruction image generator, 703 . . . data multiplexer/separator, 704 . . . network IF, 705 . . . controller, 706 . . . display setter, 707 . . . camera photographed image reconstructor, 708 . . . visual line range extractor/instruction image synthesizer, 709 . . . microphone, 20, 20a to 20d . . . instruction image, 11 . . . priority processing event, 42 . . . camera/sensor unit, 43 . . . control unit, 411a, 411b . . . speaker, 45a to 45c . . . holder, 46a . . . projector, 408a . . . screen, 47a, 47b . . . 3D camera, 408b . . . 3D display, 48b . . . holder with shutter, 12 . . . working robot, 13 . . . operation head, 4a . . . mount type device, 14 . . . facility camera, 15 . . . photographing range, 16 . . . photographing range, 17 . . . automobile, 18a . . . front camera, 18b . . . rear camera, 18c, 18d . . . side camera, 19a . . . automatic driving apparatus, 19b . . . emergency processing apparatus, 21 . . . internal bus.

The invention claimed is:

1. A remote operation instructing system comprising:
   a mount type device to be worn by a worker;
   an operation instructing apparatus through which an instructor confirms a work site to issue an instruction; and
   a network through which data are transmitted and received between the mount type device and the operation instructing apparatus,
   wherein the mount type device includes:
     a camera configured to photograph the work site in a wider range than a visual field of the worker;
     a sensor configured to obtain a visual line of the worker as sensor information; and
     a visual line movement detector configured to detect, as visual line movement information, movement of a direction of the visual line of the worker by using the sensor information,
   wherein the mount type device is configured to transmit data on the image photographed by the camera and the visual line movement information to the operation instructing apparatus via the network,
   wherein the operation instructing apparatus includes:
     a display setter configured to extract a first image having a wider range than a visual field range of the worker from the image photographed by the camera, correct the first image using the visual line movement information, and cause a display to display the corrected first image; and
     an instruction image generator configured to generate an instruction image for the worker,
   a synthesizer configured to extract a second image having the visual field range of the worker from the photographed image, and superimpose the second image and the instruction image to cause a sub display to display the second image and the instruction image,
   wherein, in a case where there is a possibility that a part of the second image protrudes outside the range of the first image, the display setter extracts an adjusted first image from the photographed image, wherein the center of the adjusted first image and the center of the second image coincide each other, and
   wherein the operation instructing apparatus is configured to transmit the instruction image to the mount type device via the network.

2. The remote operation instructing system according to claim 1,
   wherein the mount type device includes a display for the worker configured to superimpose the instruction image onto the visual field of the worker and display the instruction image.

3. The remote operation instructing system according to claim 1,
   wherein the operation instructing apparatus includes a controller configured to set a range for extracting the photographed image in the display setter.

4. The remote operation instructing system according to claim 1, wherein the display setter fixes an area of the first image to be displayed on the display even in a case where the visual line of the worker moves.

5. The remote operation instructing system according to claim 1,
wherein, in a case where a priority processing event occurs outside the visual field range of the worker, the instructor generates an instruction image to cause the worker to direct the visual line toward the priority processing event, and the operation instructing apparatus transmits, to the mount type device, the instruction image to cause the worker to direct the visual line toward the priority processing event.

6. The remote operation instructing system according to claim 1,
wherein a photographing range of the camera includes an area of the first image that is extracted and displayed by the operation instructing apparatus, and the area of the first image includes an area of the second image.

\* \* \* \* \*